3,248,544
CHLORINE LOGGING SYSTEM FOR OPTIMIZING SUBSURFACE BED RESOLUTION, DEPTH OF PENETRATION, AND LOGGING SPEED
Dale H. Reed, Henry F. Dunlap, Thomas S. Hutchinson, Robert E. McCallum, and William C. Pritchett, Dallas, Tex., assignors to The Atlantic Refining Company, Philadelphia, Pa., a corporation of Pennsylvania
Filed July 12, 1962, Ser. No. 209,395
5 Claims. (Cl. 250—71.5)

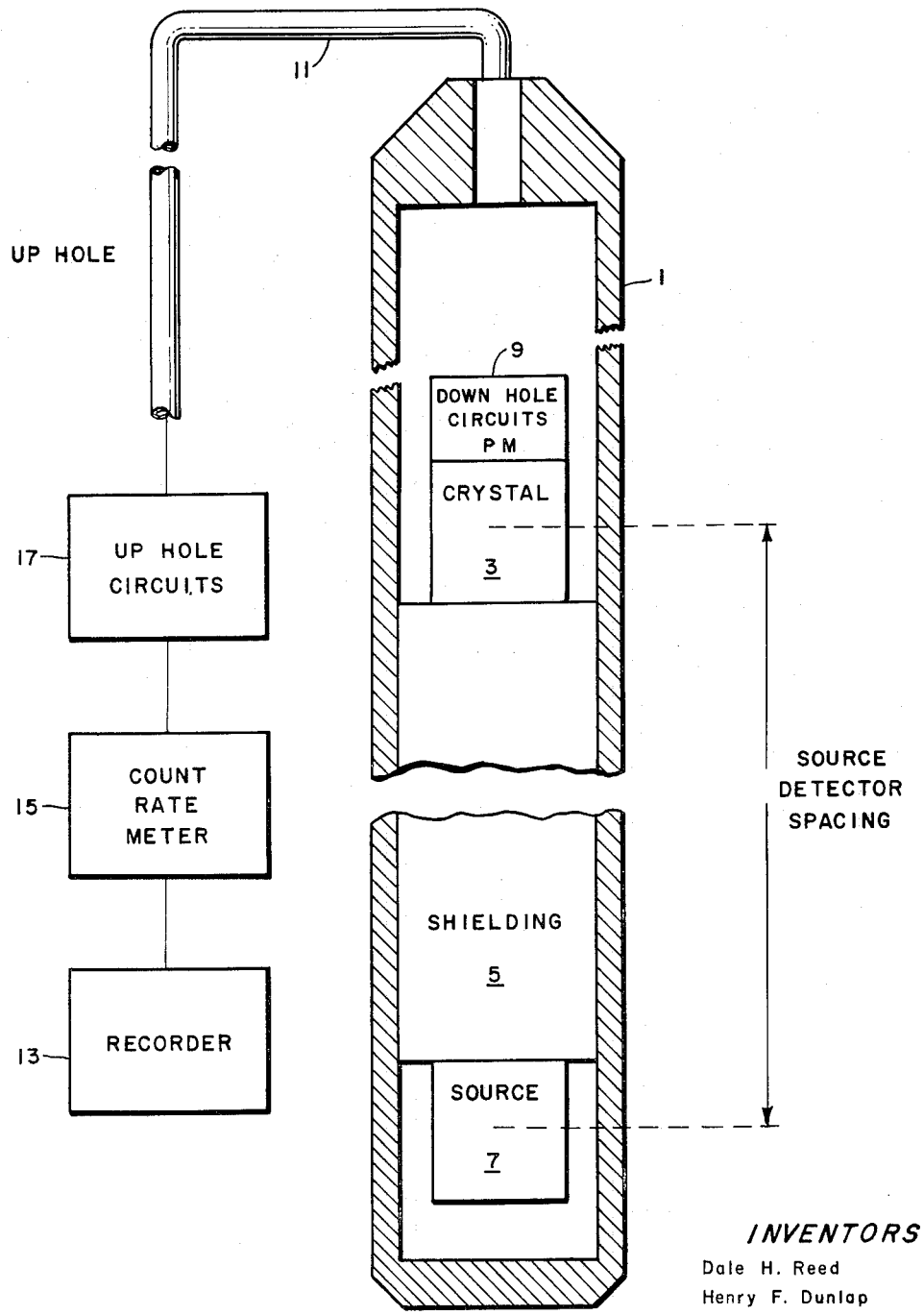

This invention relates to improvements in a chlorine logging system that optimize bed resolution and depth of penetration without sacrificing desirable logging speed.

In any type of logging system it is desirable to develop high resolution in order to be able to accurately delineate the thin beds present in the subsurface. Regardless of bed thickness, it is also desirable to be able to achieve deep penetration of the strata investigated to ensure that the effects of borehole conditions on the characteristic being measured are minimized. Lastly, it is imperative that a reasonable logging speed be maintained so that the cost of the log is not prohibitive. Unfortunately, in some types of logging, the achievement of high bed resolution and depth of penetration is made at the expense of logging speed.

In radioactive logging, particularly in chlorine logging operations, the achievement of high bed resolution is made at the expense of logging speed, or high count rate (for statistical accuracy), or both. In order to achieve good depth of penetration, it is necessary to use a long source-crystal spacing. As will be explained in more detail hereinafter, values of certain factors which maximize features such as bed resolution, statistical accuracy and depth of penetration are not compatible. Therefore, applicants' purpose is to optimize these values to produce the most effective chlorine logging system.

Heretofore, chlorine logging systems have achieved one or two of the desirable features at the expense of the remaining desirable features.

Accordingly, it is an object of the present invention to provide an improved means for conducting chlorine logging operations.

Another object of the present invention is to provide means for optimizing bed resolution and depth of penetration.

Another object of the present invention is to provide means for optimizing bed resolution and depth of penetration without sacrificing satisfactory logging speed.

Another object of the present invention is to provide means for optimizing bed resolution and depth of penetration within the limitations of an acceptable logging tool diameter.

Another object of the present invention is to provide means for optimizing depth of penetration and obtaining four foot bed resolution at logging speeds of approximately ten feet per minute with a logging sonde capable of traversing 4.5 inch, 11.6 pound casing.

Other objects and advantages of this invention will become apparent from the following description taken in conjunction with the accompanying drawings, wherein:

The drawing illustrates the inventive aspects of the improved logging system. For purposes of simplicity, the logging sonde is shown in cross section while the components within the sonde and uphole are shown in block form.

Briefly described, the invention is a combination of logging components arranged in a unique manner to optimize over-all chlorine logging performance.

Refer now to the drawing which represents a chlorine logging system. Logging sonde 1 is shown housing crystal 3, shielding means 5, source 7 and downhole circuits and photomultiplier tube 9. Sonde 1 is connected by cable 11 to uphole components. The uphole components include recorder 13, count rate meter 15 and uphole circuits 17. Since the invention works with either an uphole or downhole pulse height analyzer, the position of the analyzer can be in downhole circuits 9 or in uphole circuits 17 depending on the chlorine logging system used. The preferred system is disclosed in copending application 183,960, owned by a common assignee.

Applicants have unexpectedly found that by using a source and a crystal of at least minimum predetermined sizes and by using a specific source-crystal spacing, in conjunction with a count rate meter having a predetermined time constant, bed resolution and depth of penetration can be optimized within sonde diameter limitations without unduly reducing logging speed.

It has been determined that the following component sizes and relationships combine to produce optimum chlorine logging performance in a sonde that is capable of operating in a 4.5 inch, 11.6 pound casing. According to A.P.I. standards, this casing has a drift diameter (inside) of 3.875 inches.

(a) Radioactive source 7 should be able to produce at least $10^7$ neutrons per second.

Although it is desirable to use as large a source as possible, physical size of the source is limited by the inside dimensions of a sonde capable of traversing the 4.5 inch, 11.6 pound casing, radiation hazards, governmental regulations and economics.

The preferred source is a 10 curie source of plutonium beryllium capable of producing about $2 \times 10^7$ neutrons per second.

(b) Crystal 3 must be capable of detecting high energy gamma rays in the chlorine energy range. The crystal should be at least 2.5 inches in diameter and 2.5 inches long. These measurements do not include the can or case normally housing the crystal.

It is desirable to use as large a crystal as possible; however, again the size is limited by the inside diameter of a sonde capable of traversing a 4.5 inch, 11.6 pound casing.

A preferred crystal is a sodium iodide crystal activated with thallium and measuring 2.63 inches in diameter by 3.00 inches in length.

(c) The distance between the center of crystal 3 and source 7 should be between 20 and 21 inches. This distance is shown as the source-detector spacing in the drawing. As shown in the drawing, the centers of 3 and 7 refer to the center of the longitudinal extremes of the two components as positioned in the sonde. As will be explained in more detail hereinafter, the critical 20 to 21 inch source-crystal spacing combines with the other structural and operational limitations to ensure optimum penetration, bed resolution and logging speed.

The preferred source-crystal spacing is 20.5 inches.

(d) The time constant of count rate meter 15 should be about 10 seconds. The particular type of count rate meter used is not important as long as it operates with an approximate 10 second time constant.

Let us now consider the above-recited limitations in detail and see how they cooperate to unexpectedly produce optimum chlorine logging operations.

The physical size of the system's downhole components is fixed, at least on the high side, by the radiation hazard, economics and the minimum diameter casing the sonde is designed to traverse. A casing limitation of 4.5 inch, 11.6 pounds is selected since most of the wells suited to chlorine logging contain casing this size or greater. This size casing limits the outside diameter of the sonde to about 3.75 inches. With the outside diameter of the sonde limited by the casing diameter, one dimension of the source is determined by the wall thickness of the sonde.

Usually, this dimension is the diameter of the source container.

The maximum diameter of the crystal, plus its case, its vacuum bottle and any concentric shielding used therewith, is also established in the same manner. The diameter of the crystal and the source are recited since the sonde is always cylindrical and the use of a cylindrical configuration for the crystal and source insures maximum utilization of available space within the sonde. The minimum length of the crystal and source will be considered in the discussion of the critical source-crystal spacing. It should be noted that for purposes of this application the term "critical source-crystal spacing" refers to the source-crystal spacing range which cooperates with the other recited limitations to produce optimum chlorine logging results.

Applicants' experience and experimentation with chlorine logging and interpretation of chlorine logs over a number of years have established that a chlorine logging system should develop a bed resolution of four feet or less. Using the rule-of-thumb, accepted by those skilled in the art, that the logging speed (feet per minute) times the time constant (in seconds) of the count rate meter should be a constant value, an acceptable logging speed and time constant can be determined. Omitting for a moment statistical variations, it has been determined by applicants that if the constant produced by the above formula is equal to 100 the bed resolution is 4 feet. More specifically, at 2.5 time constants following an abrupt change in counting rate, the count rate meter will include 90 percent of this change. Therefore, with a logging speed of 10 feet per minute (or .167 ft. per second) and a time constant of 10 seconds, the bed resolution, $e$ is given as $e =$ (logging speed) (time constant) $(2.5) = (.167$ ft./sec.$) (10$ sec.$) (2.5) \sim 4$ feet.

Thus far, an acceptable logging speed and count rate meter time constant have been established to obtain the desired four foot bed resolution. In addition, maximum possible source and crystal sizes have been determined. Of course, it is recognized that the source-crystal spacing affects bed resolution as well as count rate and depth of penetration. With these considerations in mind, it is necessary to determine the source-crystal spacing to produce optimum depth of penetration.

Acceptable bed resolution and statistical control are obtained with the above-recited source and detector sizes, time constant and logging speed. Increased resolution and statistical control can be obtained by close source-crystal spacing but only at a sacrifice of depth of penetration. It has been determined after much research and experimentation that optimum depth of penetration, bed resolution and statistical control are obtained with a source-crystal spacing of between 20 to 21 inches, a source at least capable of producing $10^7$ neutrons per second and a crystal at least 2.5 inches in diameter and 2.5 inches in length, in combination with a count rate time constant of approximately 10 seconds and a logging speed of about 10 feet per minute.

It is recognized that deeper penetration with acceptable statistical control could be obtained with a larger source and crystal and a longer source-crystal spacing but this increased penetration would be obtained with a sacrifice of bed resolution due to longer spacing. In other words, optimum penetration and bed resolution with acceptable statistical controls are obtained with the combination of components as limited above.

It is to be observed that although specific embodiments of the instant invention have been illustrated and described herein, various modifications and substitutions may be made, which will be obvious to those skilled in the art, without departing from the scope of the present invention which is limited only by the appended claims.

We claim:
1. A radioactive chlorine logging system adapted to optimize subsurface bed resolution and depth of penetration without sacrificing logging speed, including, a logging sonde adapted to pass through a borehole in the earth, which system comprises:
   (a) an elongated sonde,
   (b) a radioactive source, adapted to produce at least $10^7$ neutrons per second, mounted in said sonde,
   (c) a cylindrical scintillation crystal measuring at least 2.5 inches in diameter and 2.5 inches long, the center of said crystal being mounted in said sonde about 20 to 21 inches from the center of said radioactive source,
   (d) a photomultiplier positioned in said sonde adjacent said scintillation crystal and adapted to convert scintillations to electrical pulses,
   (e) a pulse height analyzer circuit electrically connected to the output of said photomultiplier,
   (f) a count rate meter, having a time constant of about 10 seconds duration, electrically connected to the output of said pulse height analyzer, and
   (g) a recording means electrically connected to the output of said count rate meter.
2. A chlorine logging system as set forth in claim 1 wherein the outside diameter of the logging sonde is about 3.75 inches.
3. A chlorine logging system as set forth in claim 1 wherein the center of the scintillation crystal is located 20.5 inches from the center of the radioactive source.
4. A chlorine logging system as set forth in claim 1 wherein the radioactive source produces about $2 \times 10^7$ neutrons per second.
5. A chlorine logging system as set forth in claim 1 wherein the scintillation crystal is about 2.63 inches in diameter and 3.00 inches long.

References Cited by the Examiner

UNITED STATES PATENTS

| | | | |
|---|---|---|---|
| 2,583,976 | 1/1952 | Thayer | 250—83.6 |
| 2,953,685 | 9/1960 | Dewan | 250—83.6 |
| 3,090,866 | 5/1963 | Brannon | 250—71.5 |

OTHER REFERENCES

Conical Plastic Scintillators Show Total Gamma Absorption, by Hine et al., Nucleonics, September 1960, pages 92, 94 and 96.

RALPH G. NILSON, *Primary Examiner.*

JAMES W. LAWRENCE, *Examiner.*